(12) United States Patent  (10) Patent No.: US 8,839,505 B2
Childe et al.  (45) Date of Patent: Sep. 23, 2014

(54) METHOD OF MANUFACTURING A MAGNET ASSEMBLY

(75) Inventors: Matthew John Childe, Malmesbury (GB); Nigel Youan Dymond, Malmesbury (GB)

(73) Assignee: Dyson Technology Limited, Malmesbury (GB)

( * ) Notice: Subject to any disclaimer, the term of this patent is extended or adjusted under 35 U.S.C. 154(b) by 0 days.

(21) Appl. No.: 13/285,841

(22) Filed: Oct. 31, 2011

(65) Prior Publication Data

US 2012/0112861 A1 May 10, 2012

(30) Foreign Application Priority Data

Nov. 2, 2010 (GB) .................................. 1018427.3

(51) Int. Cl.
| | | |
|---|---|---|
| *H01F 7/06* | (2006.01) | |
| *H01F 41/02* | (2006.01) | |
| *H02K 15/03* | (2006.01) | |
| *H01F 7/02* | (2006.01) | |
| *H01F 1/08* | (2006.01) | |

(52) U.S. Cl.
CPC ............ *H01F 41/0253* (2013.01); *H01F 1/083* (2013.01); *H02K 15/03* (2013.01); *H01F 7/0221* (2013.01)
USPC ........... 29/607; 29/592.1; 29/602.1; 335/285; 335/286; 335/295

(58) Field of Classification Search
USPC .................. 29/602.1, 605–607; 335/285–295
See application file for complete search history.

(56) References Cited

U.S. PATENT DOCUMENTS

| | | | |
|---|---|---|---|
| 4,759,116 A | | 7/1988 | Jones |
| 4,942,322 A | * | 7/1990 | Raybould et al. ........ 310/156.11 |
| 5,040,286 A | | 8/1991 | Stark |
| 5,332,460 A | * | 7/1994 | Hosoya ........................ 156/242 |
| 5,563,463 A | | 10/1996 | Stark |
| 2004/0111869 A1 | | 6/2004 | Mikkelsen |
| 2007/0138891 A1 | * | 6/2007 | Hurst ........................ 310/156.28 |
| 2009/0284094 A1 | | 11/2009 | Horng et al. |
| 2010/0209872 A1 | | 8/2010 | Kuhn et al. |
| 2012/0049661 A1 | | 3/2012 | Ions et al. |
| 2012/0049662 A1 | | 3/2012 | Ions et al. |

FOREIGN PATENT DOCUMENTS

| | | |
|---|---|---|
| DE | 3622231 | 1/1988 |
| DE | 10 2004 058 414 | 6/2006 |
| EP | 0 218 477 | 4/1987 |
| EP | 0 854 558 | 7/1998 |
| EP | 1 075 073 | 2/2001 |
| EP | 1 223 662 | 7/2002 |
| EP | 1 710 892 | 10/2006 |
| EP | 2 113 986 | 11/2009 |
| GB | 2 172 443 | 9/1986 |

(Continued)

OTHER PUBLICATIONS

International Search Report and Written Opinion mailed Nov. 30, 2011, directed to International Application No. PCT/GB2011/051941; 8 pages.

*Primary Examiner* — Paul D Kim

(74) *Attorney, Agent, or Firm* — Morrison & Foerster LLP

(57) ABSTRACT

A method of manufacturing a magnet assembly that includes surrounding a bonded magnet with a sleeve, heating the magnet, and compressing the magnet in an axial direction such that the magnet and sleeve expand in a radial direction.

7 Claims, 2 Drawing Sheets

(56) References Cited

FOREIGN PATENT DOCUMENTS

| | | |
|---|---|---|
| JP | 61-199449 | 9/1986 |
| JP | 2-241342 | 9/1990 |
| JP | 3-253249 | 11/1991 |
| JP | 6-233502 | 8/1994 |
| JP | 10-210690 | 8/1998 |
| JP | 2003-9476 | 1/2003 |
| JP | 2004-523194 | 7/2004 |
| JP | 2007-267574 | 10/2007 |
| WO | WO-98/34324 | 8/1998 |
| WO | WO-2002/056442 | 7/2002 |

\* cited by examiner (a)

(b)

(c)

(d)

METHOD OF MANUFACTURING A MAGNET ASSEMBLY

REFERENCE TO RELATED APPLICATIONS

This application claims the priority of United Kingdom Application No. 1018427.3, filed Nov. 2, 2010, the entire contents of which are incorporated herein by reference.

FIELD OF THE INVENTION

The present invention relates to a method of manufacturing a magnet assembly suitable for use in the rotor of an electrical machine.

BACKGROUND OF THE INVENTION

The rotor of an electrical machine may comprise a magnet secured to a shaft. The tensile strength of most magnets is relatively weak. As a result, the magnet may fracture when rotating at high speed. Consequently, for high-speed applications, a reinforcing sleeve is often provided around the magnet.

The sleeve is ideally prestressed such that the magnet is maintained under compression. For a sleeve having a relatively high co-efficient of thermal expansion (e.g. steel), prestress may be achieved by heating the sleeve prior to mounting about the magnet. During subsequent cooling, the sleeve contracts and compresses the magnet. Unfortunately, this method of assembly cannot be used for a sleeve having a relatively low or negative co-efficient of thermal expansion (e.g. carbon-fiber or aramid composite). Additionally, relatively tight tolerances in the outer diameter of the magnet and the inner diameter of the sleeve are often required in order that the difference in diameters can be accommodated by the thermal expansion of the sleeve.

SUMMARY OF THE INVENTION

In a first aspect, the present invention provides a method of manufacturing a magnet assembly, the method comprising: surrounding a bonded magnet with a sleeve; heating the magnet; and compressing the magnet in an axial direction such that the magnet and sleeve expand in a radial direction.

By heating and compressing the magnet, the magnet is plastically deformed within the sleeve. The deformation causes the magnet and sleeve to expand radially, which imparts a circumferential stress to the sleeve. Consequently, when the axial compressive force is removed from the magnet, the sleeve applies a radial compressive force to the magnet. Heating the magnet reduces the compression modulus of the magnet. As a result, the axial force necessary to deform the magnet and obtain the required circumferential prestress is reduced.

Since it is not necessary to heat or cool the sleeve, the method may be used to mount a magnet within a sleeve having a relatively low or negative coefficient of thermal expansion. Additionally, since the magnet expands radially during compression, prestressing of the sleeve may be achieved without the need for tight tolerances on the diameters of the magnet and the sleeve.

The method may comprise compressing the magnet during cooling of the magnet. This then minimizes creep and relaxation of the magnet at a time when the magnet is still malleable.

A press may be used to compress the magnet within the sleeve. The parts of the press that contact the magnet may then be heated so as to avoid uneven distortion of the magnet during compression.

The magnet may comprise a bore so that the magnet assembly can be conveniently secured to the shaft, e.g. by means of an adhesive. In order that the shape and diameter of the bore are maintained during compression, the press employed to compress the magnet may comprise a pin onto which the magnet is placed. The diameter of the pin may form a sliding fit with the bore of the magnet.

The method may comprise compressing the magnet such that the diameter of the sleeve expands to a predetermined value. As a result, relatively good control may be achieved over the magnitude of circumferential stress introduced into the sleeve. For example, the method may comprise placing the magnet and sleeve into a recess having a wall, and compressing the magnet such that the sleeve expands and contacts the wall. The wall then prevents further expansion of the sleeve and the diameter of the wall defines the predetermined value to which the sleeve expands.

The sleeve may comprise a carbon-fiber composite. Carbon-fiber composites having a high tensile strength, are lightweight, non-magnetic and electrically non-conductive, and are thus ideally suited for use in the rotor of an electrical machine.

In a second aspect, the present invention provides a magnet assembly manufactured by a method as described in any one of the preceding paragraphs.

BRIEF DESCRIPTION OF THE DRAWINGS

In order that the present invention may be more readily understood, an embodiment of the invention will now be described, by way of example, with reference to the accompanying drawings, in which.

DETAILED DESCRIPTION OF THE INVENTION

Figure 1:
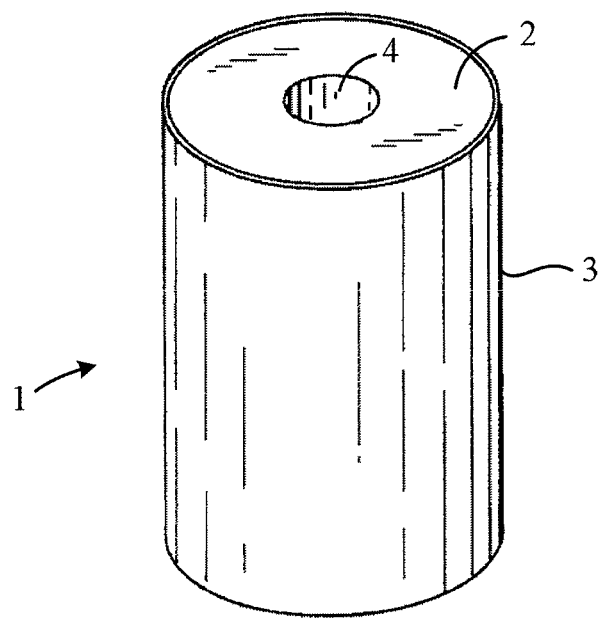
FIG. 1 is a perspective view of a magnet assembly in accordance with the present invention.

The magnet assembly 1 of FIG. 1 comprises a magnet 2 surrounded by a sleeve 3.

The magnet 2 is a bonded magnet comprising a composite of magnetic powder and binder. The magnet 2 is cylindrical in shape and has a central bore 4 that extends axially through the magnet 2.

The sleeve 3 is a hollow cylinder formed of a carbon-fiber composite. The sleeve 3 surrounds the magnet 2 and forms an interference fit with the magnet 2. Moreover, the sleeve 3 is prestressed and applies a radial compressive force to the magnet 2.

The magnet assembly 1 is intended to form part of a rotor of an electrical machine. In particular, a shaft may be secured within the bore 4 of the magnet 2, e.g. by means of an adhesive. As the rotor rotates, centrifugal forces stress the magnet radially and circumferentially. If unchecked, these tensile stresses may cause the magnet 2 to fracture. The sleeve 3, being formed of a carbon-fiber composite, is much stiffer than the magnet 2. Moreover, the sleeve 3 is prestressed and applies a radial compressive force to the magnet 2. Consequently, the sleeve 3 opposes the tensile stresses that arise during rotation.

Figure 2:
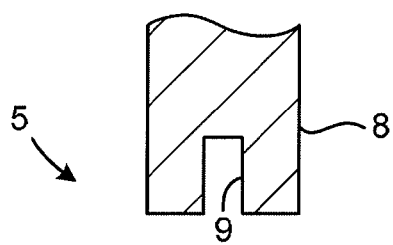
FIG. 2 illustrates a method of manufacturing the magnet assembly.
Figure 2:
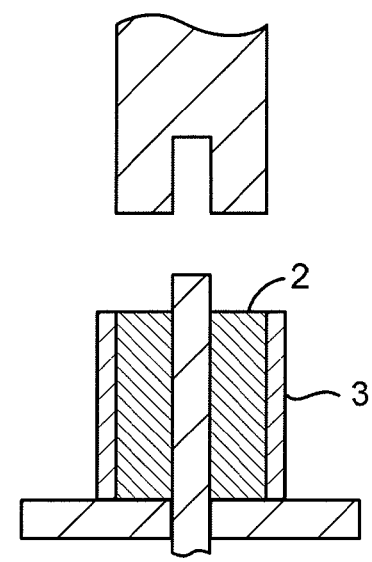
Figure 2:
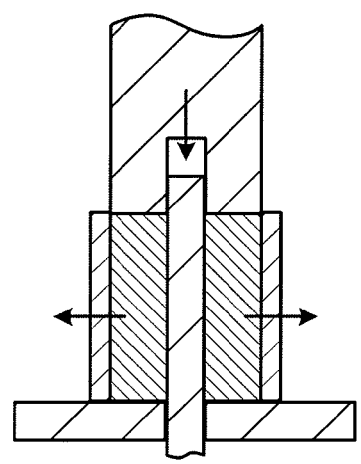
Figure 2:
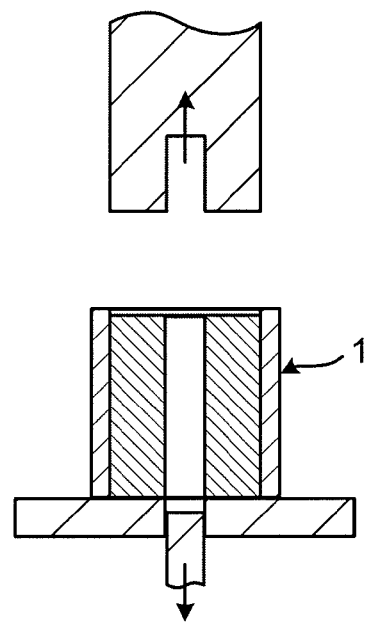

A method of manufacturing the magnet assembly 1 will now be described with reference to FIG. 2.

The magnet assembly is manufactured using a press 5 that comprises a base 6, a pin 7, and a ram 8, e.g. FIG. 2(a). The pin 7 projects through and is moveable relative to the base 6. The ram 8 is coaxial with the pin 7 and includes a recess 9 that corresponds in diameter to the pin 7. The press 5 includes electrical heating elements (not shown), which are used to heat the base 6, pin 7 and ram 8 to a predetermined temperature.

A bonded magnet 2 is pre-heated (e.g. using an oven) to the predetermined temperature. The magnet 2 is cylindrical in shape and has a central bore 4. Once at the predetermined temperature, the magnet 2 is placed onto the pin 7. The pin 7 has a diameter that forms a sliding fit with the bore 4 of the magnet 2.

A hollow sleeve 3 formed of a carbon-fiber composite is placed over the magnet 2 so as to surround the magnet 2, e.g. FIG. 2(b). The outer diameter of the magnet 2 and the inner diameter of the sleeve 3 are sized such that a clearance or transition fit is formed between the magnet 2 and sleeve 3.

The ram 8 then compresses the magnet 4 axially until a predetermined force is reached, e.g. FIG. 2(c). The diameter of the ram 8 forms a sliding fit with the sleeve 3 such that only the magnet 2 is compressed. The compression applied by the ram 8 causes the magnet 2 to deform plastically. The axial length of the magnet 2 decreases and the outer diameter of the magnet 2 increases. The increase in outer diameter of the magnet 2 causes the sleeve 3 to expand. The expansion of the sleeve 3 introduces a circumferential stress into the sleeve 3.

Once the predetermined force has been reached by the ram 8, the magnet 2, sleeve 3 and press 5 are cooled (e.g. using compressed air). During cooling, the ram 8 continues to apply the predetermined force to the magnet 2. This then minimizes creep and relaxation of the magnet 2 at a time when the magnet 2 is still malleable. Once the temperature of the magnet 2 drops below a predetermined threshold, the ram 8 is lifted, the pin 7 is lowered relative to the base 6, and the resulting magnet assembly 1 is removed from the press 5, e.g. FIG. 2(d).

The predetermined axial force applied by the ram 8 to the magnet 2 is determined by a number of factors. In particular, the axial force is determined by the required prestress of the sleeve 3, the tensile strength of the sleeve 3, the inner diameter of the sleeve 3, the compression modulus of the magnet 2, and the outer diameter of the magnet 2.

The required prestress of the sleeve 3 is typically determined by the tensile stresses that are imparted to the magnet 2 during rotation. As the magnet assembly 1 rotates, centrifugal forces stress the magnet 2 radially and circumferentially. These tensile stresses are greatest at the bore 4 of the magnet 2, and the circumferential stress is generally higher than the radial stress. The sleeve 3 is therefore ideally prestressed by an amount that results in a compressive circumferential stress being imparted to the bore 4 of the magnet 2 that offsets the tensile circumferential stress arising from the centrifugal forces. So, for example, if the centrifugal forces impart a tensile circumferential stress of +35 MPa to the bore 4 of the magnet 2 during rotation, then the sleeve 3 ideally imparts a compressive circumferential stress of at least −35 MPa to the bore 4 of the magnet 2 when stationary. In the present description, a stress having a positive value is a tensile stress, while a stress having a negative value is a compressive stress.

The compressive stresses imparted by the sleeve 3 to the magnet 2 ideally exceed the tensile stresses imparted by the centrifugal forces. Consequently, the magnet 2 is maintained under compression during rotation. Over time, the magnet 2 will creep due to the compressive stresses imparted by the sleeve 3. As a result, the compressive stresses will decrease with time. The sleeve 3 is therefore ideally prestressed such that the compressive stresses imparted by the sleeve 3 to the magnet 2 exceed the tensile stresses imparted by the centrifugal forces over the lifetime of the magnet assembly 1.

The magnet 2 typically has a positive coefficient of the thermal expansion. In contrast, the sleeve 3, being formed of a carbon-fiber composite, has a negative coefficient of thermal expansion. Accordingly, as the magnet 2 and sleeve 3 cool, the magnet 2 contracts and the sleeve 3 expands. The circumferential stress introduced into the sleeve 3 will therefore decrease during cooling and should ideally be taken into account.

For a sleeve 3 having a particular diameter and tensile strength, one can calculate the required change in diameter necessary to introduce the required circumferential prestress. Once the required change in diameter of the sleeve 3 is determined, one can calculate the required change in diameter of the magnet 2. Finally, once the change in diameter of the magnet 2 is obtained, one can calculate the required axial force using the compression modulus of the magnet 2.

The predetermined temperature to which the magnet 2 is heated is also determined by a number of factors. As the temperature of the magnet 2 increases, the compression modulus of the magnet 2 decreases. As the compression modulus decreases, the axial force required to bring about the required change in diameter of the magnet 2 decreases. It is therefore advantageous to employ a relatively high temperature so that a smaller axial force may be used. However, excessive temperatures may degrade the magnetic properties (e.g. magnet strength and magnetization) of the magnetic power and/or the adhesive strength of the binder of the magnet 2. Accordingly, the predetermined temperature is ideally selected such that the compression modulus of the magnet 2 is significantly reduced without adversely affecting the magnetic or mechanical properties of the magnet 2.

If the axial compressive force applied by the ram 8 were released while the magnet 2 is at the predetermined temperature, the radial compressive force applied by the sleeve 3 may cause the magnet 2 to contract radially. As a result, the circumferential stress in the sleeve 3 would decrease. In a worse case scenario, the radial force applied by the sleeve 3 and the bulk thermal contraction of the magnet 2 during cooling may mean that the circumferential stress is removed altogether. Accordingly, in order to minimize radial contraction of the magnet 2 during cooling, the axial force continues to be applied by the ram 8 until the temperature of the magnet 2 drops below a predetermined threshold. The particular threshold that is selected will again depend on several factors. In particular, the threshold will be determined by the magnitude of circumferential stress imparted to the sleeve 3, the behaviour of the compression modulus of the magnet 2 with temperature, and the rate of cooling of the magnet 2 subsequent to removing the axial force of the ram 8.

Heating those parts of the press 5 that come into contact with the magnet 2 avoids localized cooling of the magnet 2, which might otherwise result in uneven distortion of the magnet 2 during compression. For example, if the base 6 and ram 8 were unheated, the ends of the magnet 2 would experience a drop in temperature on coming into contact with the base 6 and ram 8. The compression modulus of the magnet 2 would then be greater at the ends of the magnet 2. Consequently, as the magnet 2 is compressed, radial expansion of the magnet 2 would be greatest at the center of the magnet 2 and the profile of the magnet 2 would resemble a barrel. The radial compressive force applied by the sleeve 3 to the magnet 2 would then be reduced or indeed non-existent at the ends of the magnet 2. As a result, fracturing may occur at the ends of the magnet 2 during subsequent rotation.

The pin 7 serves two functions. First, the pin 7 aligns the magnet 2 and sleeve 3 relative to the ram 8. Second, the pin 7 ensures that the shape and diameter of the bore 4 of magnet 2 are maintained during compression. In comparison to the magnet 2, the pin 7 has a higher coefficient of thermal expansion. The pin 7 therefore contracts by a greater amount during cooling and thus the magnet assembly 1 may be removed from the press 5.

The manufacture of a particular example of magnet assembly 1 will now be described. The magnet 2 is a Nd—Fe—B bonded magnet and comprises MQP-B+-20056-070 powder supplied by Magnequench®. The magnet 2 has a length of 22.00 mm, an outer diameter of 17.075 mm and an inner diameter of 6.225 mm. The sleeve 3 comprises a Toray® M40 carbon-fiber composite, has a length of 22.00 mm, an outer diameter 17.700 mm and an inner diameter of 17.100 mm. The radial clearance between the magnet 2 and the sleeve 3 is therefore 0.0125 mm.

The magnet assembly 1 is intended to operate at 100,000 rpm. At this speed, the tensile circumferential stress imparted by centrifugal forces to the bore 4 of the magnet 2 is around +35 MPa. The sleeve 3 therefore ideally imparts a compressive circumferential stress of at least −50 MPa to the bore 4 of the magnet 2; this then allows for subsequent creep of the magnet 3 during the lifetime of the magnet assembly 1. The rated tensile strength of the sleeve 3 is 1400 MPa, and thus the circumferential prestress introduced into the sleeve 3 should not exceed +1400 MPa.

The maximum operating temperature for the magnet 2 is 150° C. Beyond this temperature, magnetic degradation may occur. Accordingly, the predetermined temperature to which the magnet 2 and press 5 are heated is 150° C. The predetermined force applied by the ram 8 is 30 kN. This force brings about a nominal expansion in the diameter of the sleeve 3 of around 0.125 mm. A diametric increase of 0.125 mm results in a circumferential tensile stress of around +1150 MPa being introduced into the sleeve 3. As a result, a circumferential compressive stress of around −70 MPa is imparted by the sleeve 3 to the bore 4 of the magnet 2.

During cooling, the ram 8 continues to apply a compressive force of 30 kN until the temperature of the magnet 2 drops below 60° C. The compression modulus of the magnet 2 increases significantly below 100° C. Accordingly, no significant radial contraction of the magnet 2 occurs on releasing the axial force.

In the embodiments described above, the ram 8 compresses the magnet 2 until a predetermined force is reached. Alternatively, the ram 8 may compress the magnet 2 until a predetermined distance has been travelled by the ram 8. In both instances, the resulting expansion of the sleeve 3 will vary due to tolerances. As a further alternative, the ram 8 may compress the magnet 2 until the diameter of the sleeve 3 reaches a predetermined value. For example, the base 6 may include a cylindrical recess into which the magnet 2 and sleeve 3 are located. The pin 7 projects upwardly through the recess and acts to locate the magnet 2 centrally within the recess, as well as to protect the shape and diameter of the bore 4. The diameter of the recess is slightly larger than that of the sleeve 3 and defines the amount by which the sleeve 3 is permitted to expand during axial compression of the magnet 2. As the ram 8 compresses the magnet 2, the sleeve 3 expands radially until it contacts the wall of the recess. At this point further expansion of the sleeve 3 is prevented by the wall. Further compression of the magnet 2 is then halted. The point at which the sleeve 3 contacts the wall can be monitored as an abrupt change in the applied force versus the distance travelled by the ram 8. By compressing the magnet 2 until the diameter of the sleeve 3 expands to a predetermined value, better control may be achieved over the magnitude of circumferential stress introduced into the sleeve 3.

The magnet 2 employed in the above embodiments is fully cured. That is to say that the magnet 2 is cured prior to heating and compressing. Conceivably, however, the magnet 2 might be semi-cured or uncured. Rather than immediately cooling the magnet 2 following compression, the magnet 2 may instead be held at the predetermined temperature (e.g. 150°) for a predetermined period of time (e.g. one or two hours) in order to cure the magnet 2. This then has the advantage that the magnet 2 can be compressed within the sleeve 3 and cured in a single process.

In the embodiments described above, the sleeve 3 is formed of a carbon-fiber composite. Carbon-fiber composites are ideally suited for use in the rotor of an electrical machine owing to their high tensile strength, lightweight, non-magnetic and electrical insulating properties. However, the method may be used to manufacture a magnet assembly having a sleeve formed of an alternative material, e.g. stainless steel or aramid composite. Furthermore, although the provision of a bore 4 in the magnet 2 enables a shaft to be secured within the magnet assembly 1, there may be applications for which a bore 4 is not required.

During manufacture of the magnet assembly 1, the axial force applied by the ram 8 is maintained during cooling so as to minimize creep and relaxation of the magnet 2. However, maintaining the axial force during cooling may not always be necessary. For example, the magnet 2 may be cooled at a quicker rate or a greater circumferential stress may be imparted to the sleeve 3 so as to account for subsequent creep of the magnet 2 during cooling.

With the manufacturing method of the present invention, an interference fit is formed between a magnet and a sleeve without the need to heat or cool the sleeve. Accordingly, the method may be used to secure a magnet within a sleeve having a relatively low or negative coefficient of thermal expansion. Additionally, since the magnet expands radially during compression, an interference fit may be achieved and a prestress may be imparted to the sleeve without the need for tight tolerances on the diameters of the magnet and the sleeve.

The invention claimed is:

1. A method of manufacturing a magnet assembly, the method comprising:
   surrounding a bonded magnet with a sleeve;
   heating the magnet; and
   mechanically compressing only the magnet in an axial direction such that the magnet and sleeve expand in a radial direction.

2. The method as claimed in claim 1, wherein the method comprises compressing the magnet during cooling of the magnet.

3. The method as claimed in claim 1, wherein the method comprises compressing the magnet with a press and heating those parts of the press that contact the magnet.

4. The method as claimed in claim 1, wherein the magnet comprises a bore and the method comprises compressing the magnet with a press, the press comprising a pin onto which the magnet is placed.

5. The method as claimed in claim 1, wherein the method comprises compressing the magnet such that a diameter of the sleeve expands to a predetermined value.

6. The method as claimed in claim 1, wherein the method comprises placing the magnet and sleeve within a recess having a wall, and compressing the magnet such that the sleeve expands and contacts the wall.

7. The method as claimed in claim 1, wherein the sleeve comprises a carbon-fiber composite.

* * * * *